J. INGELLS.
PROPELLER WHEEL.
APPLICATION FILED APR. 28, 1917.
1,313,598. Patented Aug. 19, 1919.
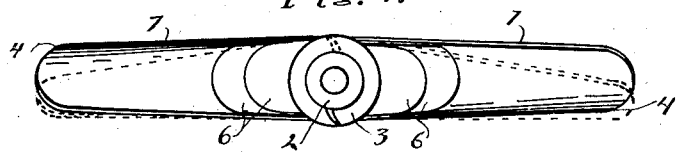
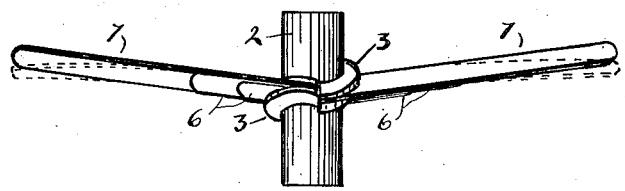
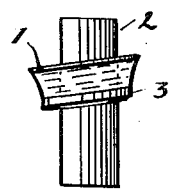 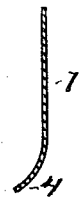
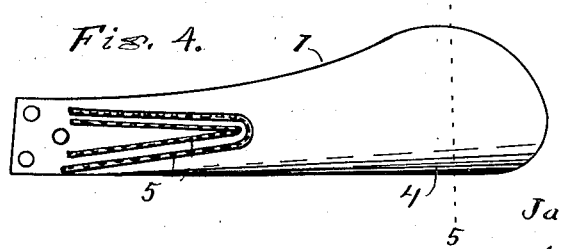
Inventor
James Ingells,

UNITED STATES PATENT OFFICE.

JAMES INGELLS, OF MUSKEGON, MICHIGAN.

PROPELLER-WHEEL.

1,313,598.     Specification of Letters Patent.     Patented Aug. 19, 1919.

Application filed April 28, 1917. Serial No. 165,292.

*To all whom it may concern:*

Be it known that I, JAMES INGELLS, a citizen of the United States, residing at Muskegon, in the county of Muskegon and State of Michigan, have invented certain new and useful Improvements in Propeller-Wheels, of which the following is a specification.

My invention relates to improvements in propeller wheels, and more particularly to wheels for use in propelling aeroplanes, and kindred craft, and its object is to provide a bucket for aeroplane propellers that will so yield to excessive pressure, as from very rapid motion, as to utilize all of the elasticity of the atmosphere when driving an aeroplane through the air.

I attain this object by the mechanism and construction shown in the accompanying drawing, in which Figure 1 is an end view of the propeller hub with the buckets extended. Fig. 2 is a side elevation of the hub with the buckets extended. Fig. 3 is a like view of the hub at right angles with Fig. 2. Fig. 4 is a plan of the preferred form of bucket detached from the hub, and Fig. 5 is a section of the same looking to the right from the line 5, 5 of Fig. 4.

Similar reference numerals indicate like parts on each of the several views.

In the construction of this wheel I make use of a steel hub 2, having supporting flanges 3, 3 upon it, and to these flanges I securely connect long, flexible wings or buckets 1, 1. These buckets are to be made of medium heavy and very highly tempered spring metal, so constructed that when being made to revolve very fast the outer ends of the buckets will be forced to change their plane, or angle in the air, as indicated by the dotted lines in Figs. 1 and 2, in such a manner that a peculiarly elastic, or springy action will be exercised upon the atmosphere that seems to impel the aeroplane with greater, or better effect than can be attained by the use of ordinary stiff, rigid wooden buckets. I find that much better results are attained by curving the back edge of the bucket near the outer end, as indicated at 4, in each of the several figures, as thereby the springy or elastic nature of the buckets is more effectively utilized.

As the elasticity of the buckets must be exercised as near the outer ends as possible, I find it not only advisable, but extremely desirable to strengthen the other end, outside of the bearing upon the flanges 3, and for this purpose I form grooves or offsets, as indicated at 5 in Fig. 4, which must be so distributed as to render this particular part of the buckets very rigid, while the outer ends are very flexible.

These wheels are especially well adapted for use on hydro-aeroplanes as they operate in water fully as efficiently as in air, and the springy nature gives them the property of causing the plane to rise from the water much more readily and successfully than with the wooden wheel in common use, and with the qualities of steel that may be obtained now the danger of breaking the buckets is reduced to the minimum, and so as not to exceed five per cent. of the breakage incident upon the use of wooden buckets for the same purposes.

It is necessary, as will be readily understood, to place these buckets upon the hubs at an angle with the surface of the hub, as indicated in Figs. 1, 2 and 3, and at an incline backward, as indicated in Figs. 2 and 3, the crosswise angle being for the purpose of giving them the proper and desired incline to give them the best possible effect upon the atmosphere, and the longitudinal incline shown in Figs. 2 and 3 is to give them the property of being pressed into the positions indicated by the dotted lines in Figs. 1 and 2 without losing, but, rather gaining efficiency.

The effect of revolving this wheel very rapidly in the air or water is to give the buckets 1, 1 a torsive or twisting effect, and to attain the best possible results from this action, that is, to give to the ends of the buckets as nearly the effect of the peculiar action of a fish's tail in the water, I find it advisable to place strengthening leaves, as 6, near the connected ends, as in Figs. 1 and 2.

The buckets should be more curved, broader, and should stand at a greater angle from the central longitudinal line of the hub, than at the hub, as indicated in Fig. 4.

What I claim as new, and desire to secure by Letters Patent of the United States, is:

1. In combination with an aeroplane wheel hub having angling flanges formed around it near the longitudinal center, spring metal buckets secured to, and radiating from the flanges at an incline from the longitudinal surface of the hub, the back edges of said buckets prominently curved at the outer ends and the curves disappearing before reaching the hub.

2. In combination with an aeroplane wheel hub having flanges set around it at an angle longitudinally of the hub, spring metal buckets secured at one end to the flanges to radiate from and stand at an incline with the longitudinal surface of the hub, a tapering curve formed at the outer end of each bucket and terminating before reaching the hub, and strengthening imprints made in the buckets to extend from the flanges of the hub outward.

Signed at Grand Rapids, Michigan, April 24, 1917.

JAMES INGELLS.